US012440959B2

(12) United States Patent
Wilcox et al.

(10) Patent No.: US 12,440,959 B2
(45) Date of Patent: *Oct. 14, 2025

(54) CARRYING CASE FOR A POWER TOOL

(71) Applicant: TECHTRONIC CORDLESS GP, Anderson, SC (US)

(72) Inventors: Berkley Wilcox, Anderson, SC (US); Joseph Smolin, Greenville, SC (US); Nicholas Proby, Easley, SC (US); Todd Gillespie, Greenville, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,184

(22) Filed: Sep. 21, 2023

(65) Prior Publication Data
US 2024/0009828 A1    Jan. 11, 2024

Related U.S. Application Data

(63) Continuation of application No. 17/523,867, filed on Nov. 10, 2021, now Pat. No. 11,858,114.

(51) Int. Cl.
*B25H 3/00* (2006.01)
*B25H 3/02* (2006.01)
*B27B 17/00* (2006.01)

(52) U.S. Cl.
CPC ............. *B25H 3/006* (2013.01); *B25H 3/022* (2013.01); *B27B 17/0008* (2013.01)

(58) Field of Classification Search
CPC ..... B27B 17/0008; B27B 17/00; B27B 31/02; B25H 3/006; B25H 3/022

(Continued)

(56) References Cited

U.S. PATENT DOCUMENTS 5,119,937 A * 6/1992 Reynolds, Jr. ...... B27B 17/0008
 206/349
7,032,749 B2 * 4/2006 Hochstetler .......... A45C 7/0031
 206/349

(Continued)

FOREIGN PATENT DOCUMENTS

CN        102848368 A      1/2013
CN        203542575 U      4/2014
(Continued)

OTHER PUBLICATIONS

Stealth Mounts 20V DeWalt Battery Holder 6 Pack of DeWalt Battery Mount | DeWalt Battery Storage | DeWalt Battery Accessories | DeWalt Battery Holder Wall Mount | DeWalt 20V Battery Holder | Made in UK (Year: 2020).*

*Primary Examiner* — Anthony D Stashick
*Assistant Examiner* — Symren K Sanghera
(74) *Attorney, Agent, or Firm* — Dority & Manning, P.A.

(57) ABSTRACT

A carrying case for a power tool and a power tool kit are provided. A carrying case for a power tool includes an interior volume defined by a top, a bottom, a front, a back, a first side, and a second side. The carrying case further includes a plurality of distinct compartments within the interior volume. The distinct compartments are configured to receive a battery-powered power tool, a battery configured to power the battery-powered power tool, and a battery charger for the battery, respectively. The carrying case further includes a battery receiver configured for locking engagement with the battery, wherein the battery receiver is formed on an interior surface of at least one of the front, back, first side, or second side.

20 Claims, 11 Drawing Sheets

(58) Field of Classification Search
USPC .................. 206/349, 373, 374, 375, 514
See application file for complete search history.

(56) References Cited

U.S. PATENT DOCUMENTS

| | | | |
|---|---|---|---|
| 8,579,113 | B2 | 11/2013 | Baumgartner |
| 8,890,478 | B2 | 11/2014 | Matthias et al. |
| 9,221,169 | B2 | 12/2015 | Seidel |
| 9,492,919 | B2 | 11/2016 | Roehm et al. |
| 10,002,379 | B2 | 6/2018 | Goto et al. |
| 10,063,096 | B2 | 8/2018 | Rejman et al. |
| 10,539,317 | B2 | 1/2020 | Werner et al. |
| 11,020,849 | B2 | 6/2021 | Vetter et al. |
| 11,063,473 | B2 | 7/2021 | Dietzel et al. |
| 2003/0075467 | A1* | 4/2003 | Anderson ............... B27B 17/00 206/349 |
| 2005/0230279 | A1* | 10/2005 | Brady ................... B25H 3/006 206/349 |
| 2008/0035507 | A1* | 2/2008 | Collister ............... B25H 3/006 206/349 |
| 2011/0006729 | A1* | 1/2011 | Matthias .............. H05K 5/0086 320/107 |
| 2012/0326669 | A1* | 12/2012 | Horiyama ............. B25H 3/006 320/113 |
| 2014/0327396 | A1* | 11/2014 | Rejman ................. B25H 3/006 320/108 |
| 2015/0022146 | A1 | 1/2015 | Huber |
| 2015/0083620 | A1* | 3/2015 | McGarry ............ B27B 17/0008 206/349 |
| 2015/0283694 | A1* | 10/2015 | Goto .................. G06Q 30/0621 705/26.5 |
| 2017/0259424 | A1* | 9/2017 | Vetter .................... H02J 7/0044 |
| 2022/0081193 | A1 | 3/2022 | Cauley, Jr. et al. |
| 2022/0094185 | A1 | 3/2022 | Ran et al. |

FOREIGN PATENT DOCUMENTS

| | | |
|---|---|---|
| CN | 103958132 B | 7/2014 |
| CN | 101947774 B | 12/2015 |
| CN | 107107331 B | 8/2017 |
| CN | 206475158 U | 9/2017 |
| CN | 102814801 B | 1/2019 |
| CN | 111515912 A | 8/2020 |
| CN | 211249985 U | 8/2020 |
| CN | 111673699 A | 9/2020 |
| CN | 211517448 U | 9/2020 |
| CN | 212123238 U | 12/2020 |
| CN | 212382222 U | 1/2021 |
| CN | 212825289 U | 3/2021 |
| CN | 213946407 U | 8/2021 |
| CN | 215920396 U | 3/2022 |
| CN | 216067396 U | 3/2022 |

* cited by examiner

CARRYING CASE FOR A POWER TOOL

This application is a continuation of U.S. patent application Ser. No. 17/523,867 filed on Nov. 10, 2021, the disclosure of which is incorporated by reference herein in its entirety.

FIELD

The present disclosure relates generally to carrying cases for a power tool.

BACKGROUND

Carrying cases have been used as reusable packaging for power tools for many years. Such cases can provide a useful combination of desirable properties. For instance, carrying cases can provide protection from damage through impact. Additionally, carrying cases can retain debris and/or fluid held within the power tool from being spilled or leaked. Further, as some power tools can contain one or more sharp or hazardous surfaces, carrying cases can protect articles with which the power tool may come in contact with from injury or damage.

However, power tools often require at least one, if not a number of, accessories for proper use of the power tool. For instance, many cutting tools such as chainsaws require lubricating oil. Moreover, a number of power tools are powered by removable batteries that require charging by a battery charger unit. Further, there are a number of accessories that users often have at the ready, such as personal protective equipment (PPE) such as protective headwear or eyewear, gloves, and spare parts, e.g., spare cutting tools, among others. Without specialized solutions, storage of all of these accessories, and particularly storage of all these accessories together in one place, can be cumbersome.

Accordingly, improved carrying cases for power tools are desired in the art. In particular, carrying cases for power tools which provide storage solutions for power tool accessories, particularly for battery-powered power tools, would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a carrying case for a power tool is provided. The carrying case includes an interior volume defined by a top, a bottom, a front, a back, a first side, and a second side. The carrying case further includes a plurality of distinct compartments within the interior volume. The distinct compartments are configured to receive a battery-powered power tool, a battery configured to power the battery-powered power tool, and a battery charger for the battery, respectively. The carrying case further includes a battery receiver configured for locking engagement with the battery, wherein the battery receiver is formed on an interior surface of at least one of the front, back, first side, or second side.

In accordance with another embodiment, a kit for transporting a power tool is provided. The kit includes a battery-powered power tool, a battery configured to power the battery-powered power tool, a battery charger for the battery, and a carrying case. The carrying case includes an interior volume defined by a top, a bottom, a front, a back, a first side, and a second side. The carrying case further includes a plurality of distinct compartments within the interior volume. The distinct compartments are configured to receive a battery-powered power tool, a battery configured to power the battery-powered power tool, and a battery charger for the battery, respectively. The carrying case further includes a battery receiver configured for locking engagement with the battery, wherein the battery receiver is formed on an interior surface of at least one of the front, back, first side, or second side. The battery-powered power tool, the battery, and the battery charger are disposed within the carrying case These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including" "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive—or and not to an exclusive—or. For example, a condition A or B is satisfied by any one of the following: A is true (or present) and B is false (or not present), A is false (or not present) and B is true (or present); and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, the present invention is directed to a carrying case for a power tool. The carrying case can include a plurality of distinct compartments within an interior volume of the carrying case. Each distinct compartments can be configured to receive an accessory for the power tool. For instance, the distinct compartments can be configured to receive a battery-powered power tool, a battery configured to power the battery-powered power tool, and a battery charger for the battery, respectively. The carrying case can include a battery receiver configured for locking engagement with the battery. The present inventors have found that the carrying case of the present invention can provide secure and safe storage and transportation of a battery-powered power tool and its associated accessories including the battery and battery charger for the power tool.

Figure 1:
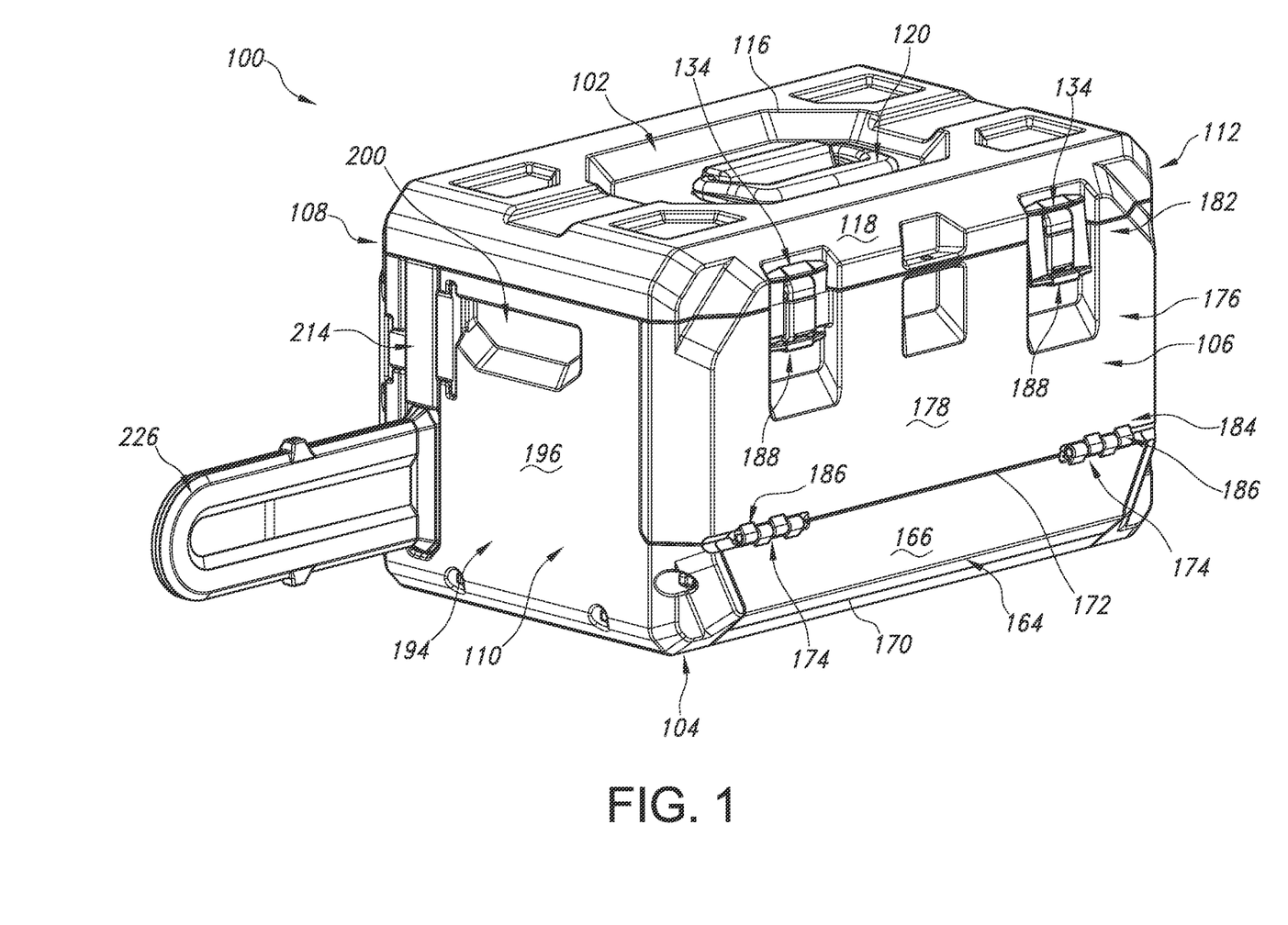
FIG. 1 is a perspective view of a carrying case for a power tool in accordance with embodiments of the present disclosure.

Referring now to the drawings, FIG. 1 illustrates a perspective view of the carrying case 100 of the present invention. The carrying case 100 includes a top 102, a bottom 104 generally opposite the top 102, a front 106, a back 108 generally opposite the front 106, a first side 110, and a second side 112 generally opposite the first side 110. An interior volume 114 of the carrying case 100 is defined within the top 102, bottom 104, front 106, back 108, first side 110 and second side 112. The carrying case 100 may include one or more handles, e.g., a handle 120 on the top 102 and/or one or more handles 200 on the first side 110 and second side 112.

Figure 2:
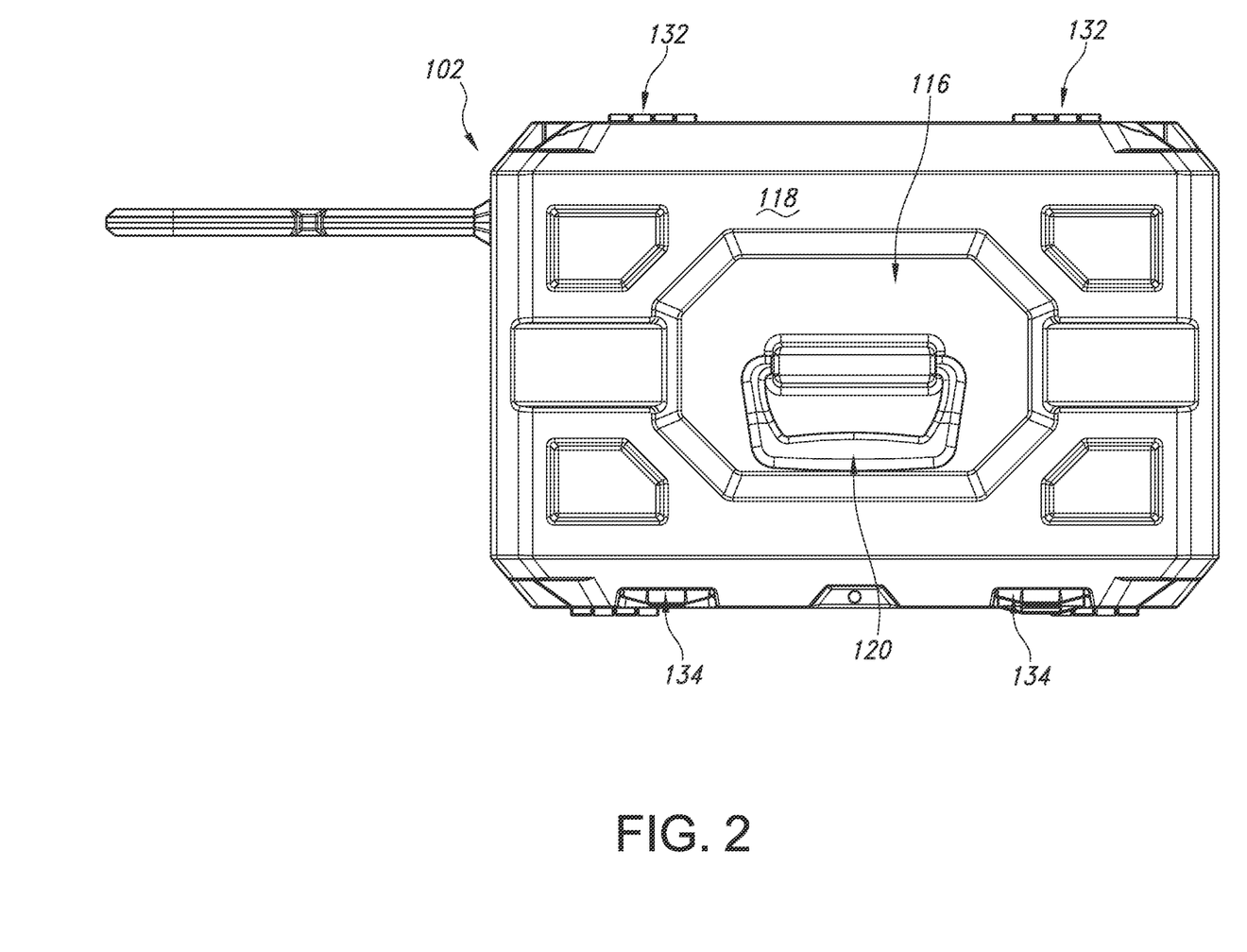
FIG. 2 is a top view of the carrying case of FIG. 1 in accordance with embodiments of the present disclosure.

The top 102 of the carrying case 100, as best seen in FIG. 1 and FIG. 2, can include a top panel 116. The top panel 116 may have an exterior surface 118 and an interior surface 122. A handle, e.g., the handle 120, may be provided at the top 102. For instance, the handle 120 can be coupled, e.g., pivotably coupled, to the exterior surface 118 of the top panel 116.

Figure 3:
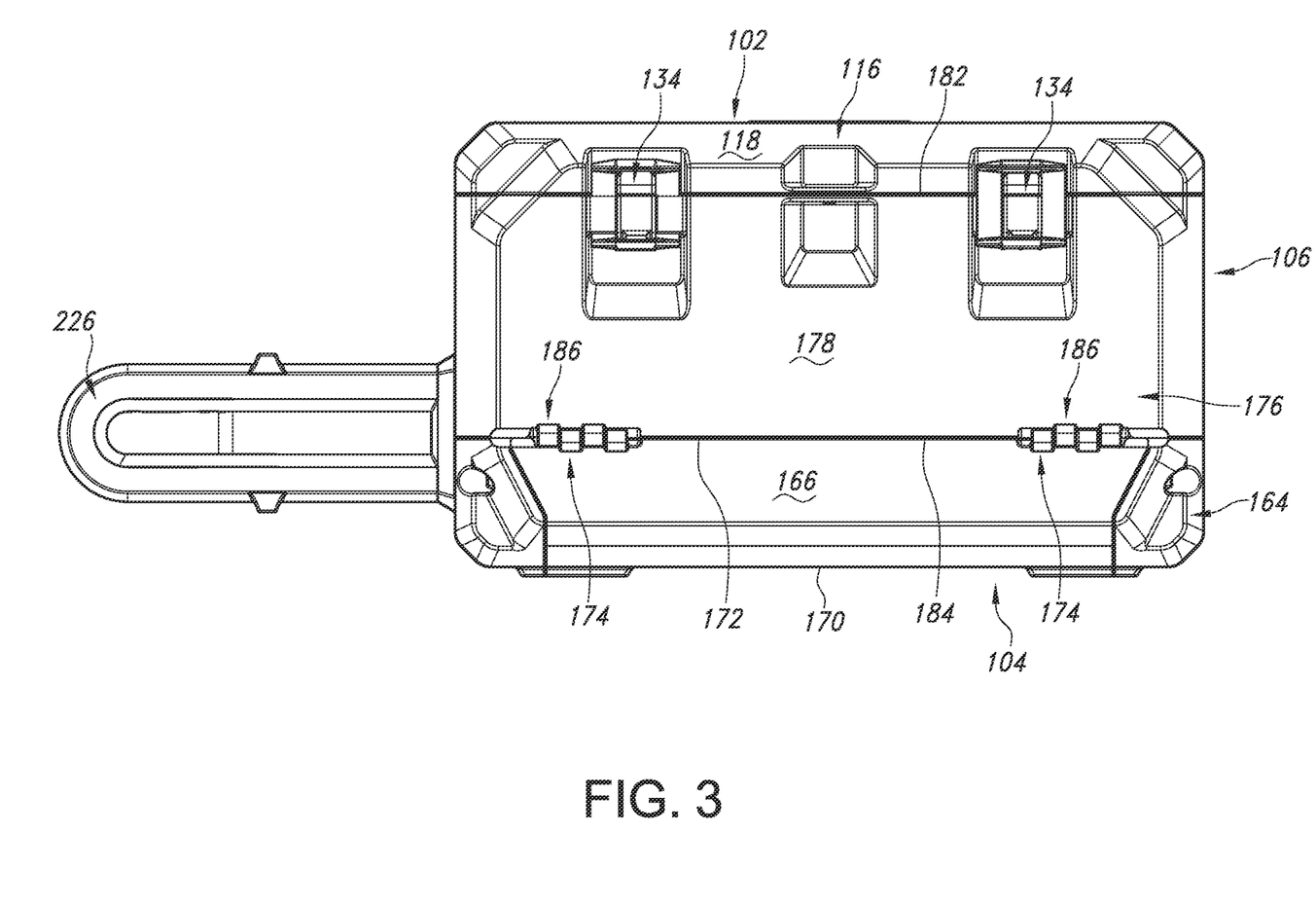
FIG. 3 is a front view of the carrying case of FIG. 1 in accordance with embodiments of the present disclosure.
Figure 4:
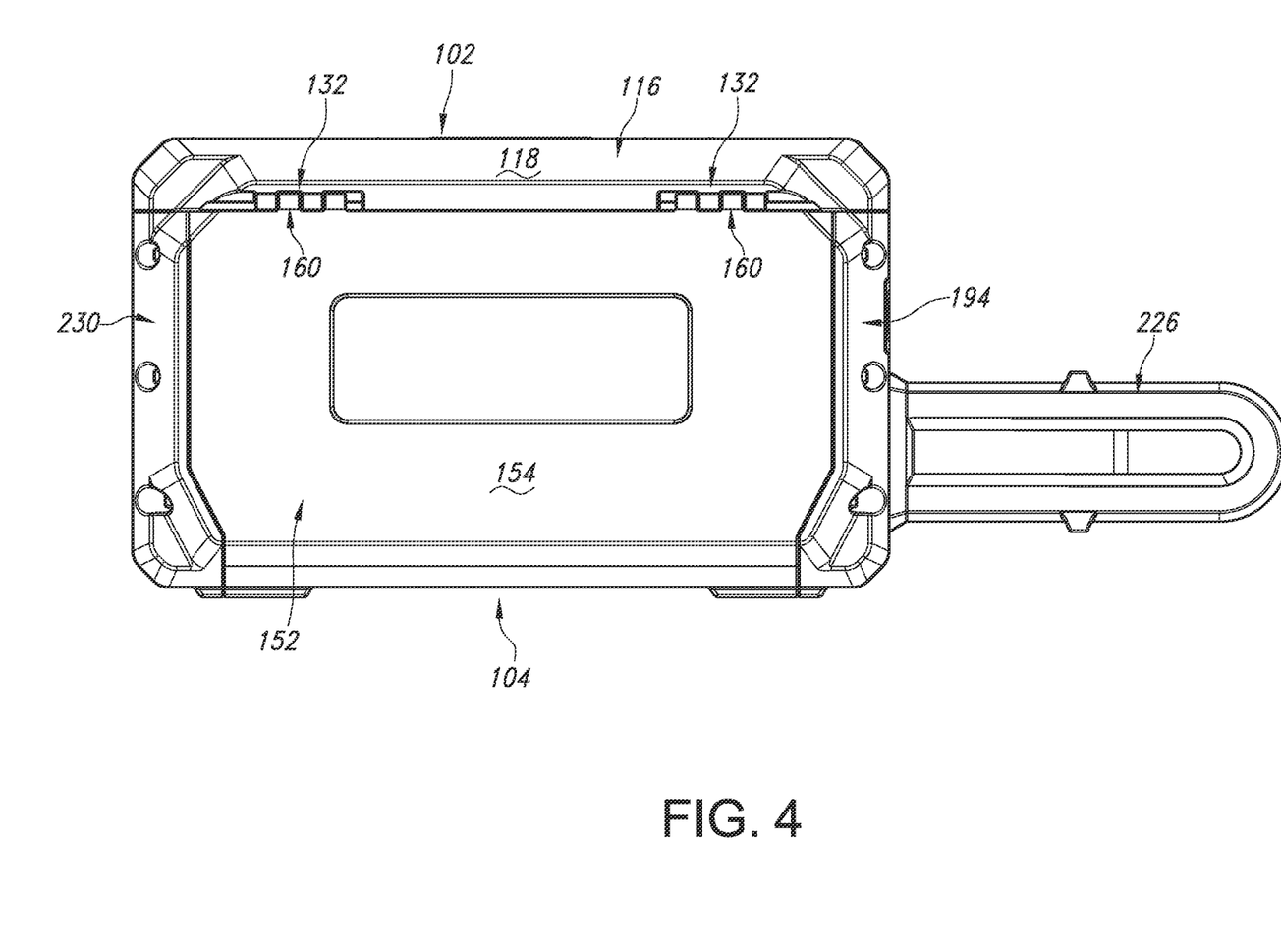
FIG. 4 is a rear view of the carrying case of FIG. 1 in accordance with embodiments of the present disclosure.

The top panel 116 can function as a door to provide access to the interior volume 114 of the carrying case 100. The top panel 116 can include one or more coupling members such as hinges 132, e.g., two sets of hinges 132 as shown in FIGS. 3-4, by which the top panel 116 can pivotably open to provide access to the interior volume 114 of the carrying case 100. The hinges 132 can be provided along an edge of the top panel 116 adjacent to the back 108 of the carrying case 100 and can be coupled to a complementary set of hinges on the back 108, as will be described in further detail below. Additionally, the top panel 116 can be locked in a closed position, e.g., by one or more latches 134. The latches 134 can be coupled to complementary latch receiver(s) 188. As shown in FIG. 1, the latches 134 can be on a different side of the top panel 116 than the hinges 132. For instance, the latches 134 can be disposed adjacent to the front 106 of the carrying case 100 opposite the back 108 of the carrying case 100. Thus, when the latches 134 are engaged with the latch receiver(s) 188, the top panel 116 may be locked in a closed position and the interior volume 114 of the carrying case 100 may be enclosed.

Figure 11:
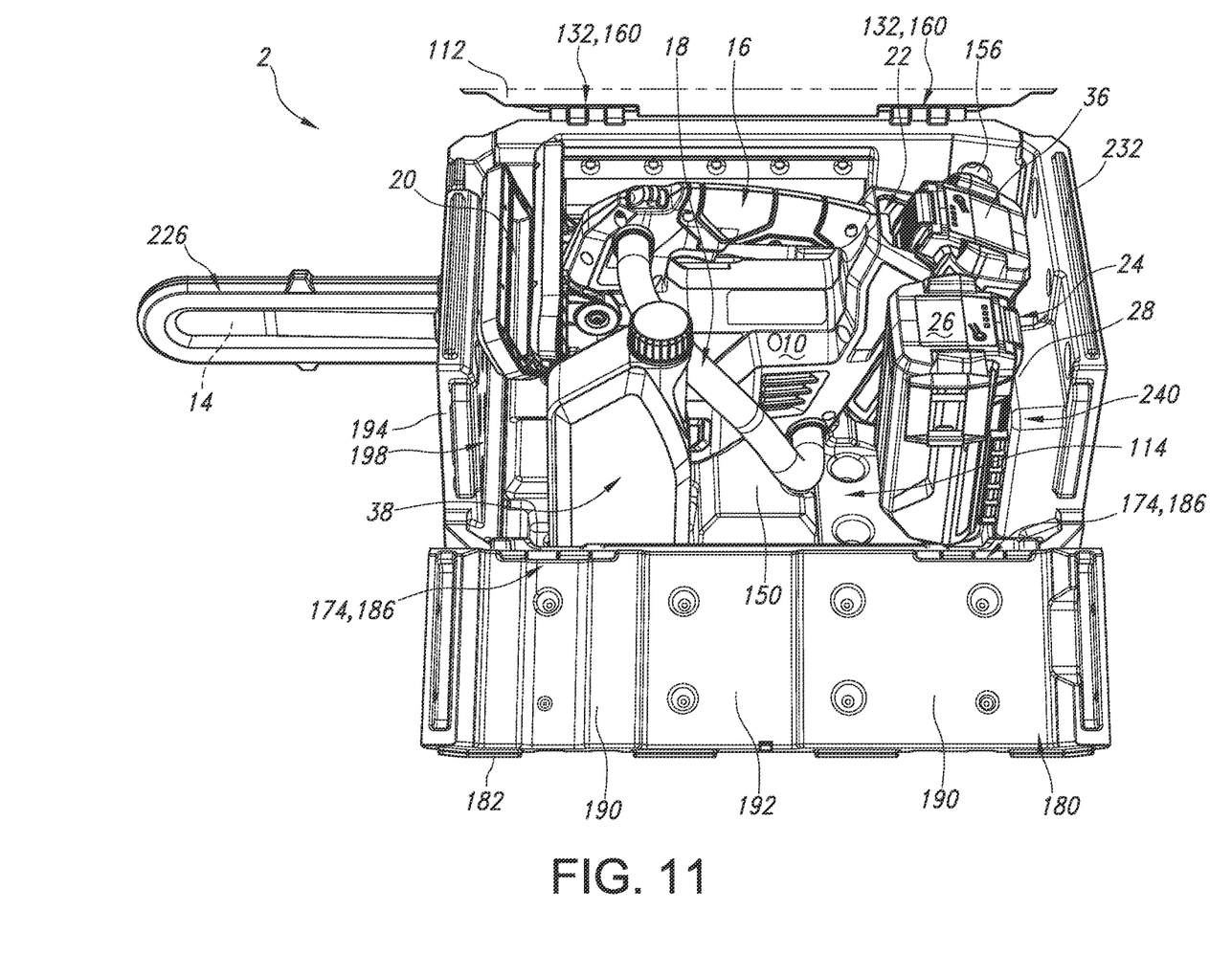
FIG. 11 is a front view of a power tool kit including the carrying case of FIG. 1 in an open configuration in accordance with embodiments of the present disclosure.

As shown in FIG. 3 and FIG. 11, the front 106 of the carrying case 100 can include a first front panel 164 and a second front panel 176. The first front panel 164 can have an exterior surface 166 and an interior surface 168 which each extend from a bottom edge 170 to a top edge 172. The bottom edge 170 of the first front panel 164 can be disposed adjacent to the bottom 104 of the carrying case 100, and the top edge 172 of the first front panel 164 can be spaced from both the bottom 104 and the top 102 of the carrying case 100.

The second front panel 176 can have an exterior surface 178 and an interior surface 180 which each extend from a top edge 182 to a bottom edge 184. The top edge 182 of the second front panel 176 can be disposed adjacent to the top 102 of the carrying case, and the bottom edge 184 of the second front panel 176 can be spaced from both the bottom 104 and the top 102 of the carrying case 100. As shown in FIG. 2, the top edge 172 of the first front panel 164 can be disposed adjacent to the bottom edge 184 of the second front panel 176. For instance, the top edge 172 of the first front panel 164 can abut the bottom edge 184 of the second front panel 176 such that the first front panel 164 and the second front panel 176 together form the front 106 of the carrying case 100. Additionally, as described briefly above, the second front panel 176 can include one or more latch receivers 188 adjacent to the top edge 182 that are configured to receive the one or more latches 134 to secure the top panel 116 and close the carrying case 100. As best seen in FIG. 11, the interior surface 180 of the second front panel 176 can include one or more recesses 190 separated by at least one protruding wall portion 192. The protruding wall portions 192 can have a panel thickness extending from the exterior surface 178 to the interior surface 180 that is greater than a panel thickness from the exterior surface 178 to the interior surface 180 of any of the recesses 190. The recesses 190 can be provided as at least a portion of a compartment to hold accessories within the interior volume 114, and the protruding wall portion 192 can divide or separate the respective compartments.

Further, as illustrated in FIG. 3 and FIG. 11, the first front panel 164 and the second front panel 176 may be pivotably coupled together. For instance, the first front panel 164 can have one or more hinges 174 along the top edge 172 of the exterior surface 166 thereof and the second front panel 176 can have one or more hinges 186 along the bottom edge 184 of the exterior surface 178 thereof that complementarily couple to the one or more hinges 174 of the first front panel 164. As such, the second front panel 176 can pivot open to provide access to the interior volume 114 of the carrying case 100. As shown in FIG. 3, the latches 134 of the top panel 116 and the complementary latch receivers 188 extend onto the front 106 of the carrying case 100. Thus, the second front panel 176 is prevented from pivoting open along the hinges 186 when the top panel 116 is closed and the latches 134 are engaged. However, as shown in FIG. 11, when the top panel 116 is in an open configuration, the second front panel 176 can be pivotably opened along the hinges 186 away from the interior volume 114 of the carrying case 100 to provide additional access to the interior volume 114, e.g., to more easily access items stored within the interior volume 114.

FIG. 4 illustrates a rear view of the carrying case 100, i.e., a view of the back 108 of the carrying case 100. The back 108 includes a back panel 152 which includes an exterior surface 154 and an interior surface 156. The back panel 152 can include one or more hinges 160 that are complementary to the hinges 132 of the top panel 116 such that the top panel 116 is pivotably coupled to the back panel 152.

Figure 5:
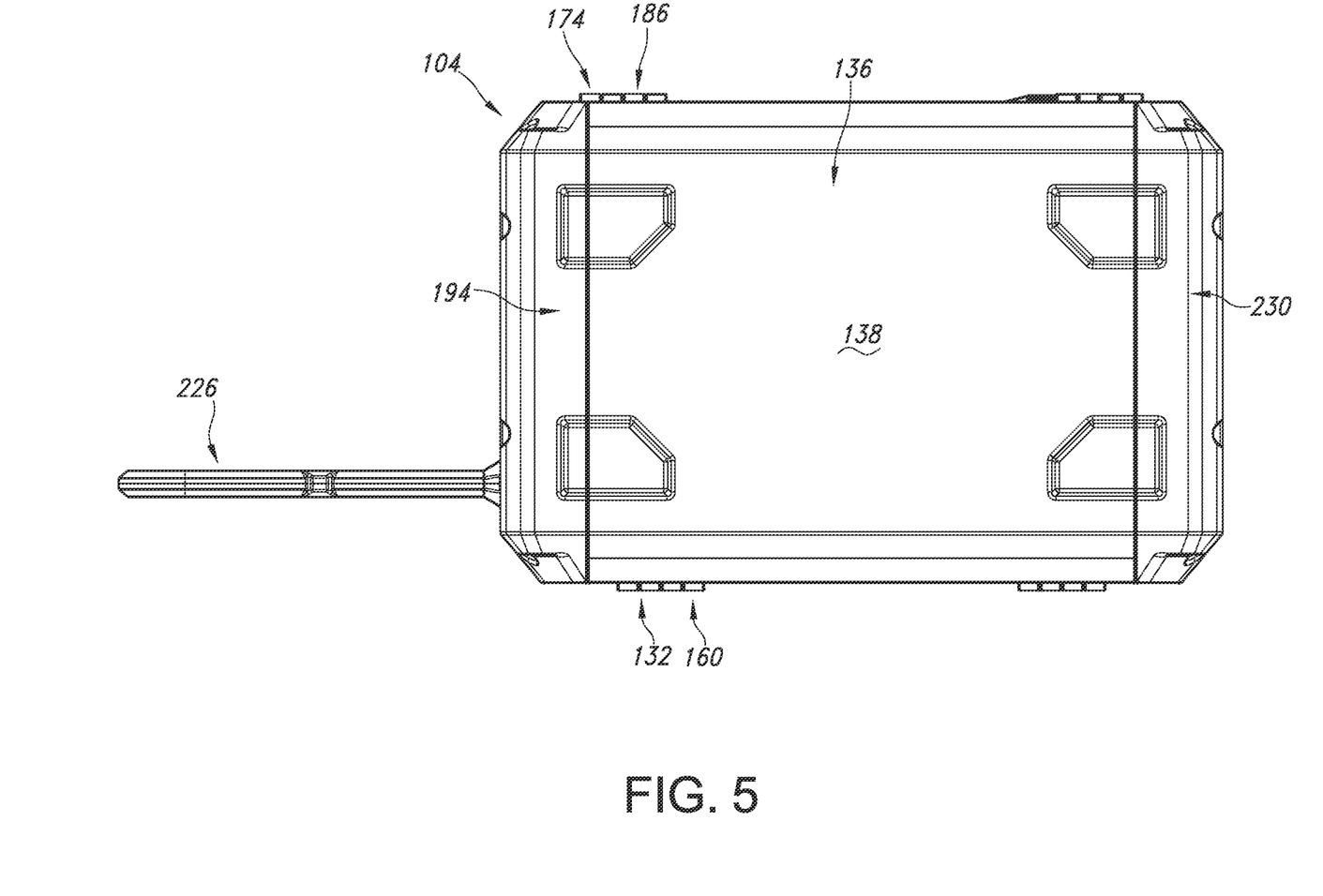
FIG. 5 is a bottom view of the carrying case of FIG. 1 in accordance with embodiments of the present disclosure.
Figures 8A, 8B:
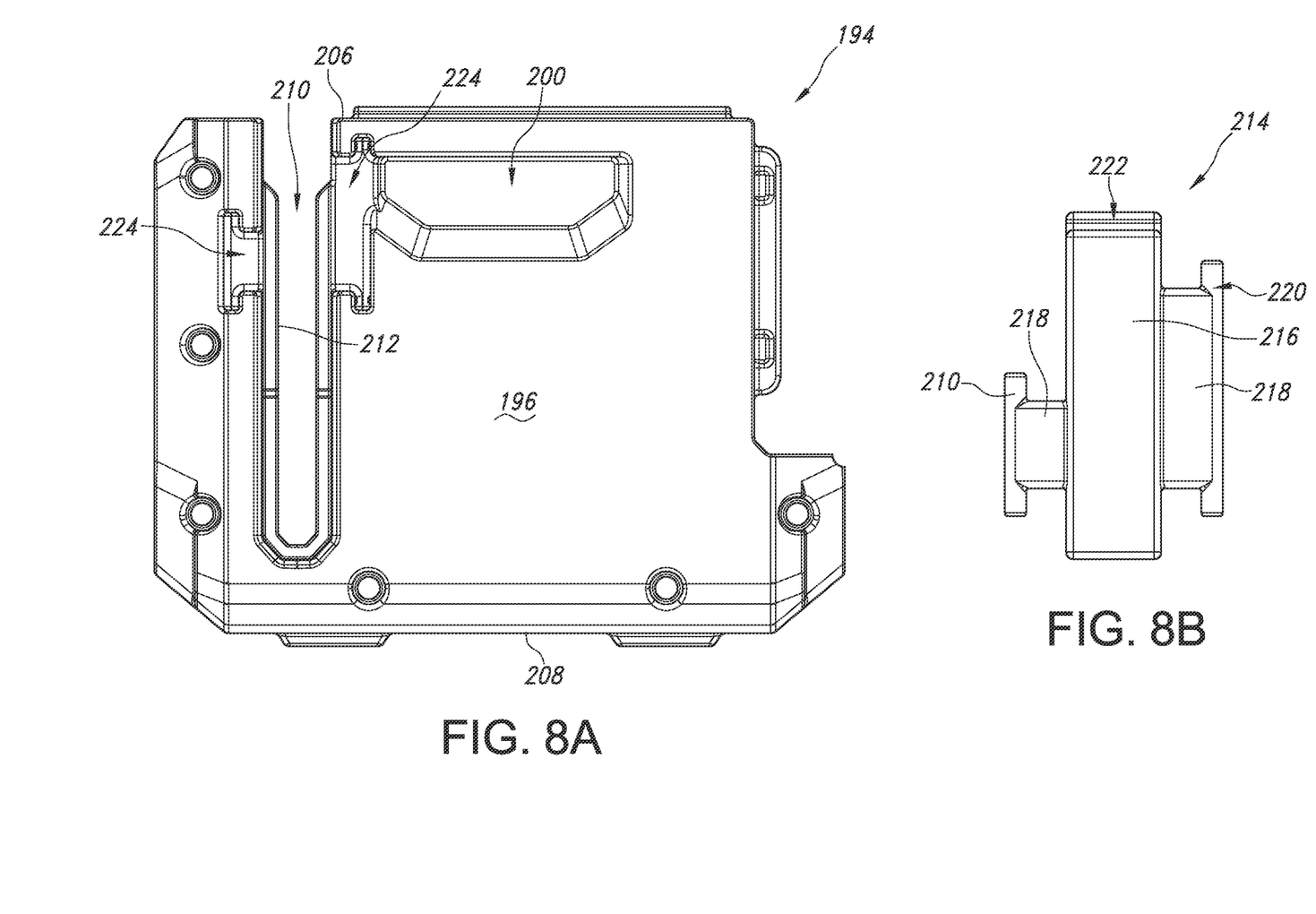
FIG. 8A is a front view of the exterior surface of the left side panel of the carrying case of FIG. 1 in accordance with embodiments of the present disclosure.
FIG. 8B is a front view of the cover piece of the carrying case of FIG. 1 in accordance with embodiments of the present disclosure.

FIG. 5 illustrates a bottom view of the carrying case 100, i.e., a view of the bottom 104 of the carrying case 100. The bottom 104 includes a bottom panel 136 including an exterior surface 138 and an interior surface 140 (shown in FIG. 8 and described in further detail below). The bottom panel 136 extends from the front 106 to the back 108 of the carrying case 100. Further, as shown in FIG. 5, at least a portion of a first side panel 194 and a second side panel 230 are disposed along the bottom 104 of the carrying case 100.

Figure 6:
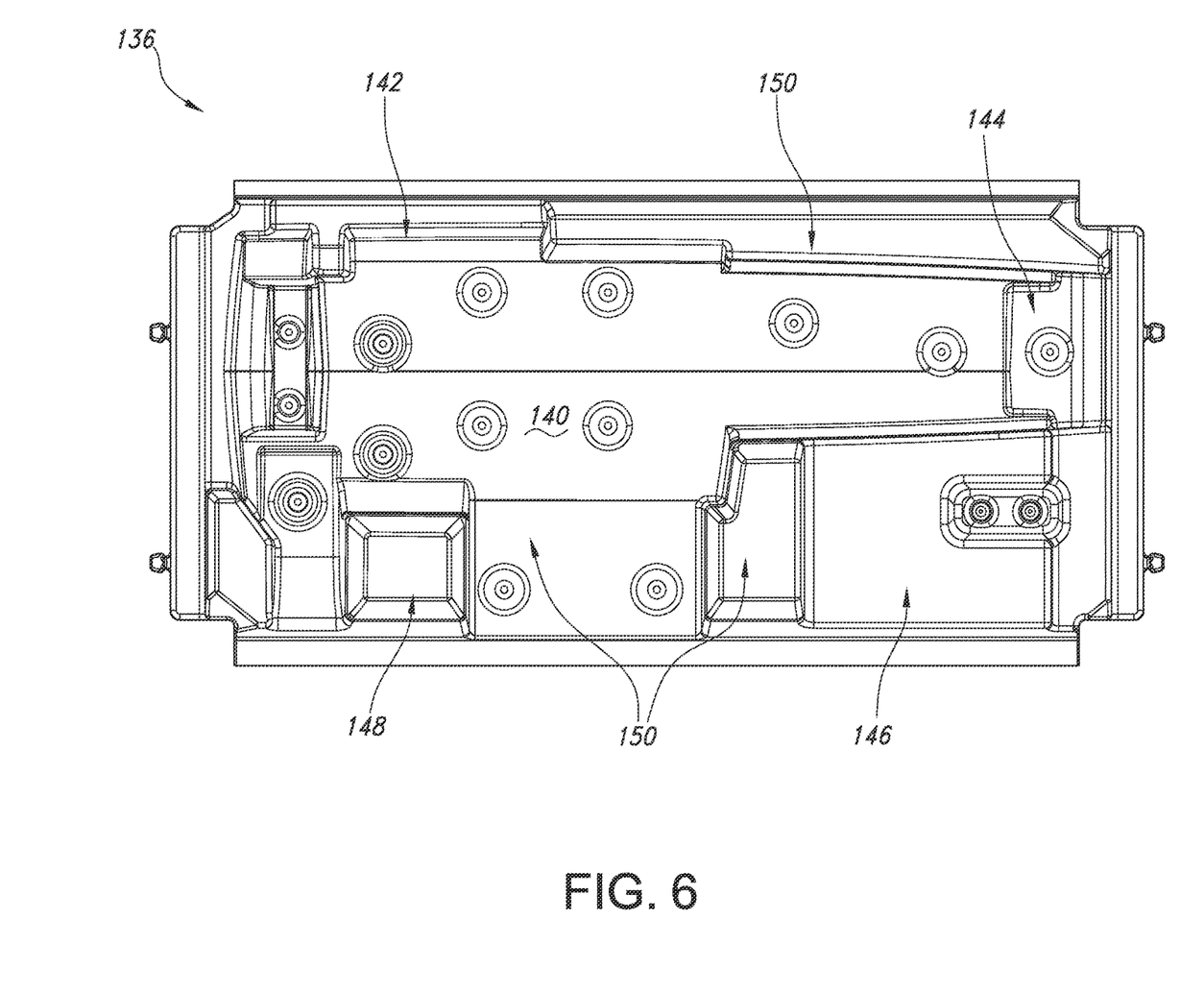
FIG. 6 is a top view of the bottom panel of the carrying case of FIG. 1 in accordance with embodiments of the present disclosure.

Turning to FIG. 6, a view of the interior surface 140 of the bottom panel 136 is provided. The interior surface 140 includes a power tool compartment base 142 configured to receive a power tool; a charger compartment base 144 configured to receive a battery charger for the power tool; a battery compartment base 146 configured to receive a battery for the power tool; and an accessory compartment base 148 configured to receive at least one additional accessory of the power tool. Protruding sections 150 of the interior surface 140 can divide each of the compartment bases 142, 144, 146, 148. The bottom panel 136 can have a bottom panel thickness extending between the exterior surface 138 and the interior surface 140. The bottom panel thickness of the protruding sections 150 is greater than the bottom panel thickness of any of the compartment bases 142, 144, 146, 148.

Figure 7:
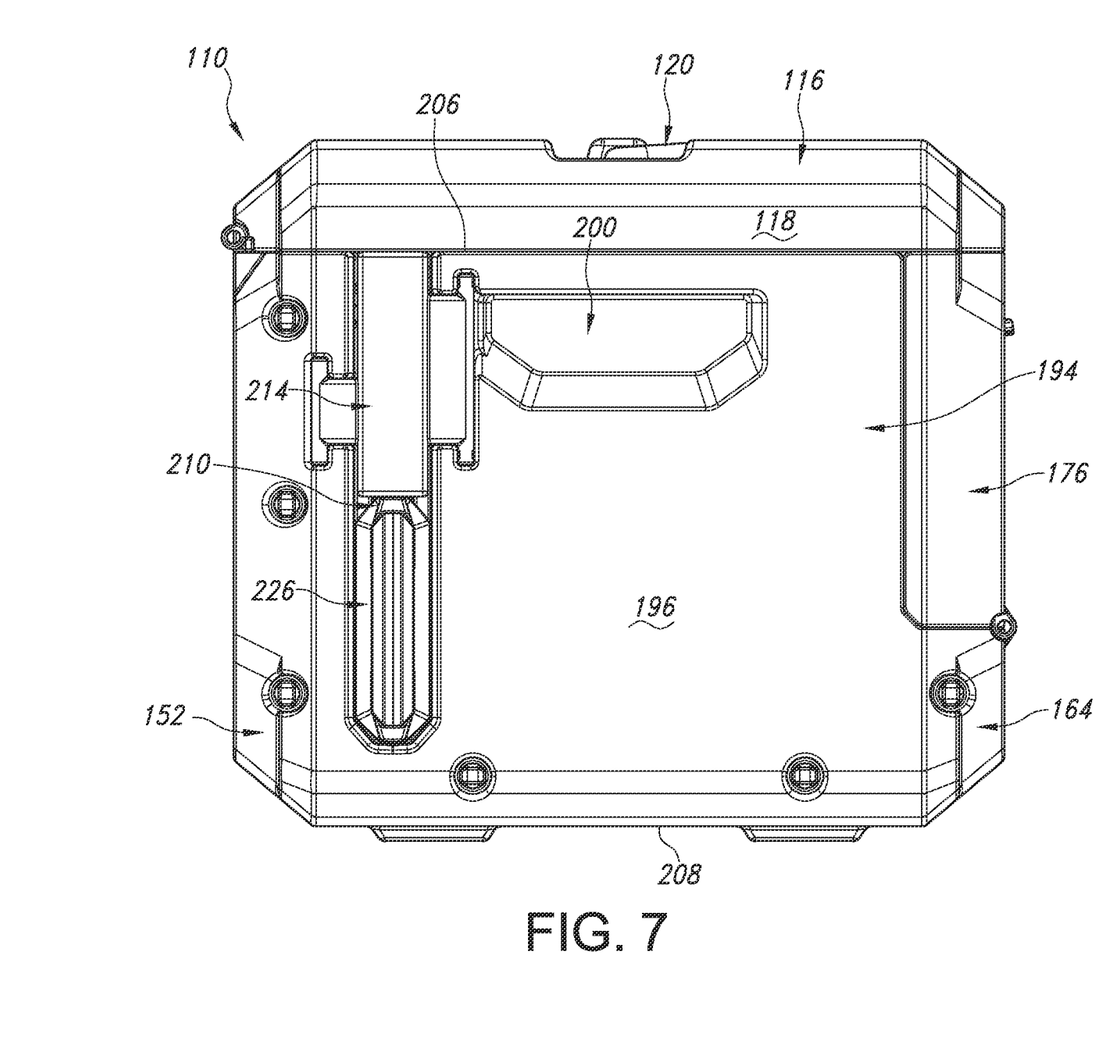
FIG. 7 is a left side view of the carrying case of FIG. 1 in accordance with embodiments of the present disclosure.

FIG. 7 shows a left side view of the carrying case 100, i.e., a view of the first side 110 of the carrying case 100. The first side 110 can include a first side panel 194 which can have an exterior surface 196 and an interior surface 198. A handle 200 may be formed in the exterior surface 196 of the first side panel 194. The first side panel 194 can extend from a top edge 206 to a bottom edge 208. The top edge 206 can be adjacent to the top panel 116 of the carrying case 100 and the bottom edge 208 can be adjacent to the bottom 104 of the carrying case 100.

The first side panel 194 can include a channel 210 configured to receive a portion of the power tool to enable the portion of the power tool to extend outside the interior volume 114 of the carrying case 100. The channel 210 can be a generally U-shaped channel as shown in FIG. 7 and FIG. 8A. The channel 210 can extend from the top edge 206 of the first side panel 194 toward the bottom edge 208 of the first side panel 194. The channel 210 can be spaced from the bottom edge 208 of the first side panel 194. However, the present invention contemplates alternative embodiments of the channel, e.g., extending from the bottom edge 208 toward the top edge 206, or extending from a side toward an opposite side, so long as the channel 210 can be enclosed at at least one end thereof. The channel 210 can include a gasket 212 surrounding the channel 210 configure to provide a cushioned, sealable, padded, or otherwise protected surrounding for the channel 210. As shown in at least FIGS. 1 and 7, a protective cover for a portion of the power tool such as a scabbard 226 can extend through the channel 210.

As shown in FIGS. 7 and 8B, a cover 214 can be provided to cover or enclose at least a portion of the channel 210, e.g., a portion of the channel 210 through which the scabbard 226 does not extend when the power tool is placed within the carrying case 100. The cover 214 may be removably coupled to the first side panel 194. The cover 214 can include a main body 216 configured to cover or enclose a portion of the channel 210, and one or more extending wings 218 configured to extend beyond a width of the channel 210 to assist with securing the cover 214 to the first side panel 194. For instance, a first extending wing may extend towards a first, e.g., right, side of the channel 210 and a second extending wing 218 may extend towards a second, e.g., left, side of the channel 210. Each of the extending wings 218 can include a distal elongated portion 220 configured to extend toward the top edge 206 and the bottom edge 208 of the first side panel 194 relative to the extending wings 218. The exterior surface 196 of the first side panel 194 can include complementary recesses 224 on either side of the channel 210 to receive the extending wings 218 and distal elongated portions 220 of the cover 214. Further, the main body 216 of the cover 214 can include a recessed portion 222 forming a groove at a top side or top edge thereof configured to be enclosed by the top panel 116 of the carrying case 100 when the carrying case 100 is in a closed arrangement. However, it is to be understood that the particular geometry of the cover 214, including extending wings 218, distal elongated portions 220, and recessed portion 222, is not limited to that which is illustrated in FIGS. 7, 8A and 8B and the cover 214 can be formed from any suitable geometric shape(s) that cover or enclose an open portion of the channel 210 and can be secured to the first side panel 194. Additionally, the present invention contemplates the use of one or more fasteners such as a latch, lock, pin, screw, or other suitable fastener not formed as part of the first side panel 194 to secure the cover 214 in place relative to the channel 210.

Figure 9:
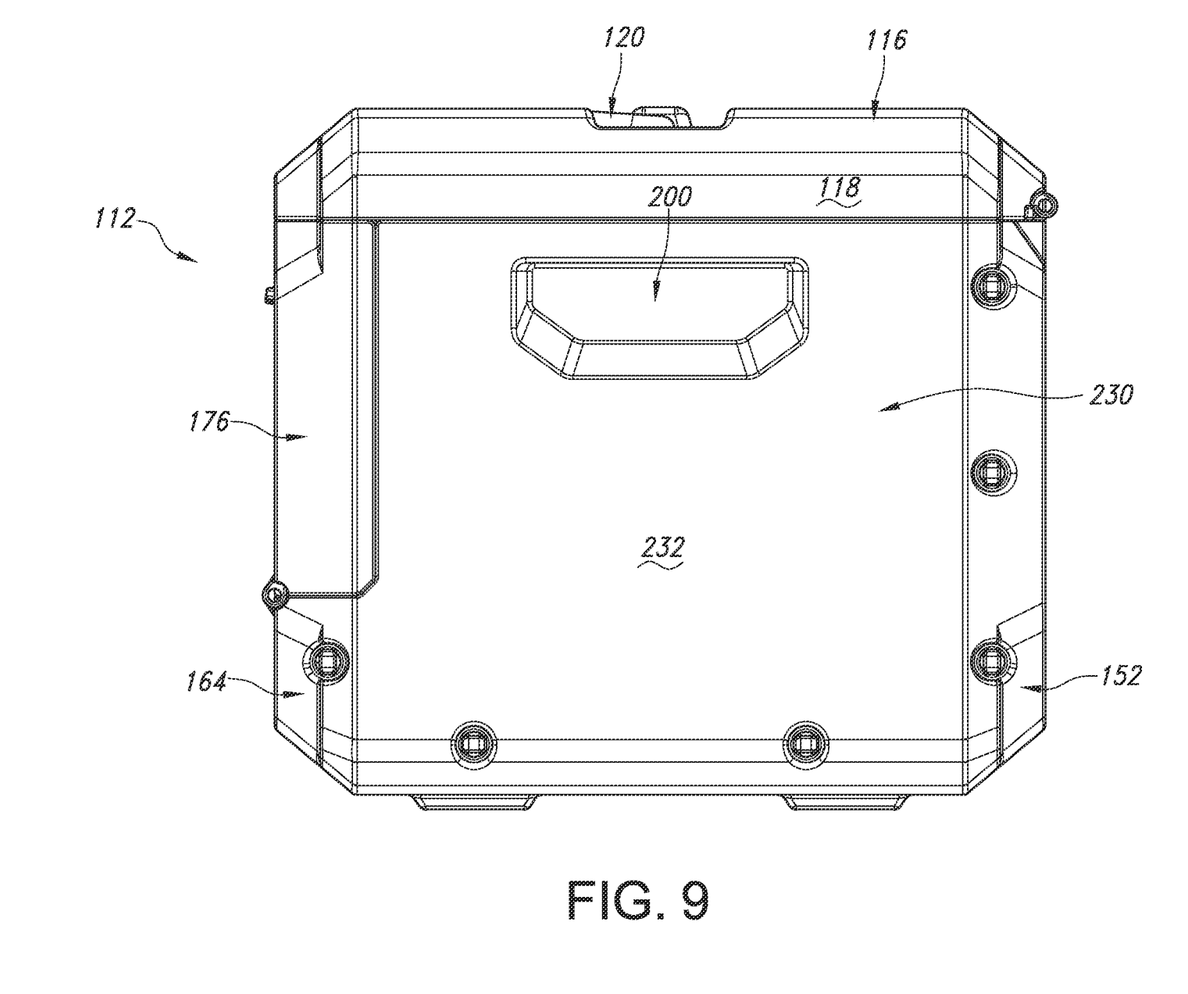
FIG. 9 is a right side view of the carrying case of FIG. 1 in accordance with embodiments of the present disclosure.
Figure 10A:
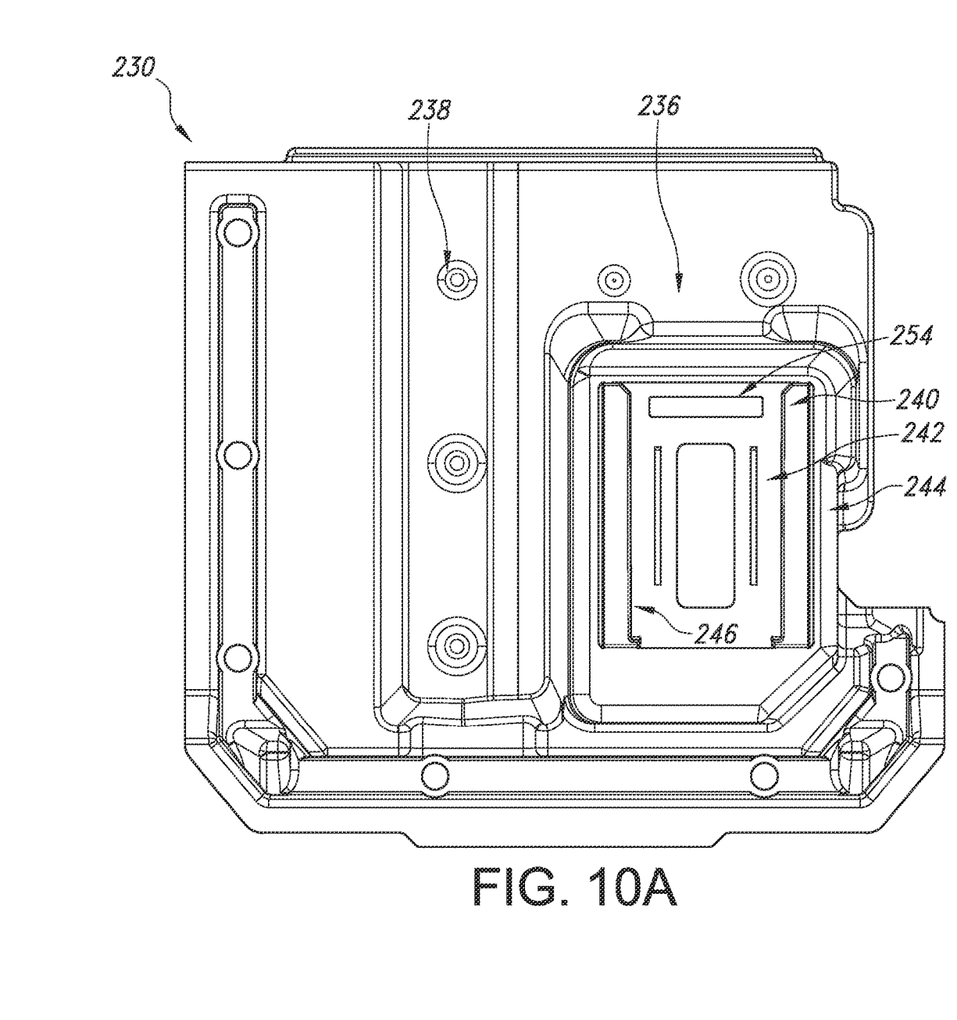
FIG. 10A is a front view of the interior of the right side panel of the carrying case of FIG. 1 in accordance with embodiments of the present disclosure.
Figure 10B:
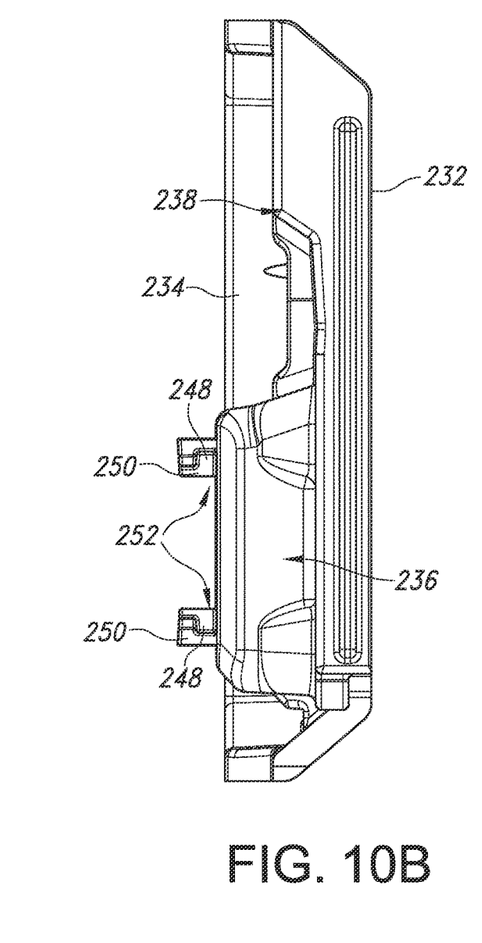
FIG. 10B is a side view of the right side panel of the carrying case of FIG. 1 in accordance with embodiments of the present disclosure.

FIGS. 9 and 10A-B illustrate the second side 112 of the carrying case 100. The second side 112 includes a second side panel 230 which can include an exterior surface 232 and an interior surface 234. The exterior surface 232 can have a handle 200 formed thereon, e.g., opposite the handle 200 of the first side panel 194.

The interior surface 234 of the second side panel 230 can include at least one protruding portion 236 and at least one recessed portion 238, as best seen in the top-down view shown in FIG. 10B. The second side panel 230 has a second side panel thickness extending from the exterior surface 232 to the interior surface 234. The second side panel thickness of the protruding portion 236 can be greater than the second side panel thickness of the recessed portion 238. The recessed portion 238 can form at least a part of an accessory compartment of the carrying case 100. For instance, the recessed portion 238 can be aligned with the battery charger compartment base 144 of the bottom panel 136 to form at least a portion of a compartment for a battery charger compartment within the interior volume 114.

The protruding portion 236 of the interior surface 234 of the second side panel 230 can be aligned with the battery compartment base 146 of the bottom panel 136 to form at least a portion of a compartment for a battery compartment within the interior volume 114. As illustrated in FIGS. 10A and 10B, the protruding portion 236 can be provided with a battery receiver 240. The battery receiver 240 can be configured to receive, e.g., couple to and/or secure in place, a battery for the power tool. The battery receiver 240 can include a "common foot" 242 configured to complementarily receive the battery.

The common foot 242 can include a pair of mounting rails including a first rail 244 and a second rail 246 extending generally parallel to each other. The first rail 244 and the second rail 246 can extend in a vertical direction, e.g., generally perpendicular to the bottom 104 of the carrying case 100. Each of the first rail 244 and the second rail 246 can include a first wall 248 extending perpendicular to the interior surface 234 and a second wall 250 extending from the first wall 248 and extending generally perpendicular to the first wall 248, forming a generally L-shaped arrangement. In this arrangement, each second wall 250 can extend generally parallel to the interior surface 234 along the protruding portion 236. A receiving groove 252 can be formed in a space between the protruding portion 236, first wall 248 and second wall 250 of each of the first rail 244 and the second rail 246.

In use, a battery 24 (seen in FIG. 11) can be inserted into a battery compartment of the interior volume 114 of the carrying case 100 by sliding a battery housing 26 into the battery receiver 240. Specifically, the battery housing 26 can have a complementary pair of mounting rails 32 formed on a side thereof that are configured to be received within the receiving grooves 252 of the first rail 244 and second rail 246 of the common foot 242. Further, the battery housing 26 can include a latch 28 attached thereto, e.g., above the complementary rails along the same side of the battery housing 26. The latch 28 can be received within a latch receptacle 254 of the battery receiver 240 in order to secure the battery 24 in place relative to the battery receiver 240. In this manner, the battery 24 can be received by both the battery compartment base 146 of the bottom panel 136 and secured within the interior volume 114 to the battery receiver 240 to prevent movement of the battery 24 within the carrying case 100, thereby protecting the battery 24 from potential damage.

As illustrated in FIG. 11, the carrying case 100 can be configured to carry a power tool. The power tool can be, e.g., a chain saw 10 such as a battery-powered chain saw. The chain saw 10 can have a motor housing 12, a guide bar and saw chain 14 extending from the motor housing 12, handles such as a top handle 16 and a side handle 18, a hand guard 20 and a battery receiver 22. The guide bar and saw chain 14 can be enclosed within the scabbard 226 to provide protection to the guide bar and saw chain 14 from damage and to prevent the saw chain from causing any damage to a user or objects nearby. The hand guard 20 can extend upward from the motor housing 12 of the chain saw 10. The hand guard 20 may be operably coupled to an emergency brake for the chain saw 10, e.g., when the hand guard 20 is rotated forward toward the guide bar and saw chain 14. When the hand guard 20 and emergency brake are disengaged, i.e., the hand guard 20 is in its upward position, the hand guard 20 may extend above the front 106 and back 108 of the carrying case 100 such that the top 102 cannot be closed. When the hand guard 20 and emergency brake are engaged, i.e., the hand guard 20 is rotated forward toward the first side 110 of the carrying case 100 and toward the guide bar and saw chain 14, the hand guard 20 may be in a sufficiently compact position to remain within the interior volume 114 of the carrying case 100 such that the top panel 116 can be closed over the hand guard 20.

The chain saw 10 may be a battery powered chain saw as described above. A battery charger 36 for the battery 24 of the chain saw 10 can be disposed adjacent to the battery receiver 22 of the chain saw 10 within the interior volume 114, e.g., sitting in the battery charger compartment base 144 of the bottom panel 136. Further, the chain saw 10 may require lubricating oil. A bottle 38 of lubricating oil may be received in the interior volume 114, e.g., sitting in the accessory compartment base 148 of the bottom panel 136. Moreover, as shown in FIG. 11, when the chain saw 10, battery 24, battery charger 36 and bottle 38 are stored within the interior volume 114, there can be additional space within the interior volume 114 in which additional accessories can be stored. For instance, gloves, personal protective equipment such as protective eyewear, ear protection, or any other desirable accessories may be stored within the interior volume 114. As described above, the second front panel 176 and the top panel 116 can be pivotably closed to enclose the interior volume 114 of the carrying case 100 and secure the power tool and accessories for storage and/or transport.

A power tool kit 2 may include the power tool, e.g., chain saw 10, a battery 24 configured to power the power tool, a battery charger 36 for the battery, one or more accessories for the power tool such as a bottle of lubricating oil, and a carrying case 100 for storage and/or transport of the each of the power tool, battery, battery charger, and one or more accessories. The power tool, battery, battery charger and one or more accessories can be disposed within the carrying case 100 to form the kit 2.

Further aspects of the invention are provided by one or more of the following embodiments:

Embodiment 1: A carrying case for a power tool, comprising: an interior volume defined by a top, a bottom, a front, a back, a first side, and a second side; a plurality of distinct compartments within the interior volume, wherein the distinct compartments are configured to receive a battery-powered power tool, a battery configured to power the battery-powered power tool, and a battery charger for the battery, respectively; and a battery receiver configured for coupling engagement with the battery, wherein the battery receiver is formed on an interior surface of at least one of the front, back, first side, or second side.

Embodiment 2. The carrying case of any one or more of the embodiments, wherein the battery receiver comprises first and second mounting rails configured to complement a complementary pair of mounting rails of the battery, and a latch receptacle configured to receive a latch of the battery.

Embodiment 3. The carrying case of any one or more of the embodiments, wherein the first and second mounting rails each comprise an L-shape and a channel configured to receive the complementary pair of mounting rails of the battery.

Embodiment 4. The carrying case of any one or more of the embodiments, wherein the battery receiver is adjacent to the compartment configured to receive the battery charger along the second side; wherein the second side comprises a second side panel having a protruding portion comprising the battery receiver, the protruding portion having a thickness extending from an exterior to an interior surface of the second side panel, and a recessed portion having a thickness extending from an exterior to an interior surface of the second side panel, wherein the thickness of the protruding portion is greater than the thickness of the recessed portion such that the battery receiver protrudes into the interior volume relative to the compartment configured to receive the battery charger.

Embodiment 5. The carrying case of any one or more of the embodiments, wherein the front comprises a first panel and a second panel pivotably coupled together, wherein each of the first panel and the second panel extend between the first side and the second side.

Embodiment 6. The carrying case of any one or more of the embodiments, wherein the first panel is adjacent to the bottom and the second panel is adjacent to the top.

Embodiment 7. The carrying case of any one or more of the embodiments, further comprising at least one additional compartment configured to receive a power tool accessory.

Embodiment 8. The carrying case of any one or more of the embodiments, wherein the power tool accessory is a bottle of fluid.

Embodiment 9. The carrying case of claim 1, wherein the bottom comprises a bottom panel, wherein each distinct compartment is defined in part by at least one recess in the bottom panel specific to each respective compartment, further wherein the recesses are separated by portions of the bottom panel having a panel thickness that is greater than a panel thickness of the recesses.

Embodiment 10. The carrying case of any one or more of the embodiments, wherein the power tool is a chain saw.

Embodiment 11. The carrying case of any one or more of the embodiments, wherein the first side comprises a first side panel that extends from the front to the back, wherein the first side panel comprises a channel configured to receive a portion of the power tool that extends outside the interior volume, wherein the channel is spaced from both the front and the back.

Embodiment 12. The carrying case of any one or more of the embodiments, wherein the channel further comprises a gasket.

Embodiment 13. The carrying case of any one or more of the embodiments, wherein the first side further comprises a cover removably coupled to the first side panel, wherein the cover is configured to cover at least a portion of the channel; wherein an exterior surface of the first side panel comprises at least one recess configured to receive a coupling member of the cover.

Embodiment 14. The carrying case of any one or more of the embodiments, wherein the cover further comprises a groove at a top side thereof configured to receive a portion of a top panel of the top side of the carrying case.

Embodiment 15. A kit for transporting a power tool comprising: a battery-powered power tool; a battery configured to power the battery-powered power tool; a battery charger for the battery; and a carrying case comprising: an interior volume defined by a top, a bottom, a front, a back, a first side, and a second side; a plurality of distinct compartments within the interior volume, wherein the distinct compartments are configured to receive a battery-powered power tool, a battery configured to power the battery-powered power tool, and a battery charger for the battery, respectively; and a battery receiver configured for locking engagement with the battery, wherein the battery receiver is formed on an interior surface of at least one of the front, back, first side, or second side; wherein the battery-powered power tool, the battery, and the battery charger are disposed within the carrying case.

Embodiment 16. The kit of any one or more of the embodiments, wherein the power tool is a chain saw.

Embodiment 17. The kit of any one or more of the embodiments, further comprising at least one accessory for the power tool.

Embodiment 18. The kit of any one or more of the embodiments, wherein the at least one accessory comprises a bottle of fluid.

Embodiment 19. The kit of any one or more of the embodiments, wherein at least a portion of the power tool extends outside the interior volume when the carrying case is in a closed arrangement.

Embodiment 20. The kit of any one or more of the embodiments, further comprising a scabbard configured to cover the portion of the power tool that extends outside the interior volume of the carrying case.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A carrying case, comprising: a chainsaw, the chainsaw having a hand guard operably coupled to a brake and configured to move in a first direction toward a saw chain to engage the brake in an engaged position, and configured to move in a second direction upward to a disengaged position of the brake; and an interior volume
defined by a top, a bottom, a front, a back, a first side, and a second side, wherein the first side comprises a channel configured to receive at least a portion of a saw chain of the chainsaw therethrough, and wherein the front or back extends less than the chainsaw in the disengaged position, and wherein said one of the front or back extend above the chainsaw in the engaged position, and wherein the first side is positioned proximate to the brake in a rotated position toward the channel to permit closure of the top over the interior volume.

2. The carrying case of claim 1, comprising a battery compartment formed at least partially at the bottom within the interior volume.

3. The carrying case of claim 2, wherein the battery compartment is positioned adjacent to the second side and the front.

4. The carrying case of claim 1, comprising a battery charger compartment formed at least partially at the bottom within the interior volume.

5. The carrying case of claim 4, wherein the battery receiver compartment is positioned adjacent to the second side and the back.

6. The carrying case of claim 1, comprising:
a battery receiver formed on an interior surface at the second side and adjacent to a battery charger compartment formed at least partially at the bottom within the interior volume and configured to receive a battery charger along the second side, the battery receiver configured for coupling engagement with a battery, wherein the battery receiver comprises first and second mounting rails configured to complement a complementary pair of mounting rails of the battery.

7. The carrying case of claim 6, wherein the battery receiver comprises a latch receptacle configured to receive a latch of the battery.

8. The carrying case of claim 6, wherein the first and second mounting rails extend along the interior surface at the second side in a vertical direction perpendicular to the bottom.

9. The carrying case of claim 6, wherein the first and second mounting rails comprise a first wall extending perpendicular to the interior surface and a second wall extending from the first wall and extending perpendicular to the first wall.

10. The carrying case of claim 6, wherein the battery receiver is adjacent along the second side to the battery charger compartment,
wherein the second side comprises a second side panel having a protruding portion comprising the battery receiver, the protruding portion having a thickness extending from an exterior to the interior surface of the second side panel, and a recessed portion having a thickness extending from an exterior to the interior surface of the second side panel,
wherein the thickness of the protruding portion is greater than the thickness of the recessed portion such that the battery receiver protrudes into the interior volume relative to the battery charger compartment.

11. The carrying case of claim 10, wherein the protruding portion is aligned with a battery compartment base of the bottom to form at least a portion of a battery compartment formed at least partially at the bottom within the interior volume.

12. The carrying case of claim 11, wherein the first and second mounting rails comprise a first wall extending perpendicular to the interior surface and a second wall extending from the first wall and extending perpendicular to the first wall, and wherein a receiving groove is formed between the protruding portion, the first wall, and the second wall.

13. The carrying case of claim 1, wherein the front comprises a first front panel and a second front panel,
wherein the first front panel extends from a first bottom edge to a first top edge, the first bottom edge of the first front panel disposed adjacent to the bottom, the first top edge of the first front panel spaced from the bottom and the top,
wherein the second front panel extends from a second top edge to a second bottom edge, the second top edge of the second front panel disposed adjacent to the top, the second bottom edge of the second front panel spaced from the bottom and the top, the first top edge of the first front panel disposed adjacent to the second bottom edge of the second front panel.

14. The carrying case of claim 13, the carrying case comprising a hinge at the first top edge and the second bottom edge configured to complimentarily couple to one another.

15. The carrying case of claim 13, wherein the top comprises a latch configured to couple to the second front panel.

16. The carrying case of claim 13, wherein an interior surface of the second front panel comprises a recess separated by a protruding wall portion.

17. The carrying case of claim 16, wherein the bottom at least partially forms an accessory compartment, and wherein the recess at the second front panel at least partially forms the accessory compartment.

18. A carrying case for a chainsaw, the carrying case comprising:
an interior volume defined by a top, a bottom, a front, a back, a first side, and a second side, wherein the first side comprises a channel configured to receive a saw chain of the chainsaw therethrough to extend outside of the interior volume;
a plurality of distinct compartments formed at least partially at the bottom within the interior volume, wherein the plurality of distinct compartments comprises a chainsaw compartment configured to receive at least a portion of the chainsaw, and wherein the plurality of distinct compartments comprises a battery compartment configured to receive a battery configured to power the chainsaw;
a battery receiver formed on an interior surface at the second side, wherein the battery receiver comprises first and second mounting rails configured to complement a complementary pair of mounting rails of the battery, wherein the battery receiver is adjacent along the second side to a battery charger compartment of the plurality of distinct compartments, the battery charger compartment formed at least partially at the bottom within the interior volume,
wherein the second side comprises a second side panel having a protruding portion comprising the battery receiver, the protruding portion having a thickness extending from an exterior to the interior surface of the second side panel, and a recessed portion having a thickness extending from an exterior to the interior surface of the second side panel, and
wherein the thickness of the protruding portion is greater than the thickness of the recessed portion such that the battery receiver protrudes into the interior volume relative to the battery charger compartment.

19. The carrying case of claim 18, wherein the channel at the first side is positioned opposite of a battery charger compartment of the plurality of distinct compartments.

20. The carrying case of claim 18, wherein the plurality of distinct compartments comprises a battery charger compartment configured to receive a battery charger, wherein the battery charger compartment is positioned adjacent to the second side and the back, and wherein the chainsaw compartment is positioned adjacent to the back and the battery charger compartment.

\* \* \* \* \*